(12) United States Patent
Liou et al.

(10) Patent No.: US 7,233,488 B2
(45) Date of Patent: Jun. 19, 2007

(54) DISPLAY DEVICE HAVING A RETRACTABLE SUPPORTING UNIT

(75) Inventors: Guan-De Liou, Taipei (TW); I-Cheng Lo, Taichung Hsien (TW)

(73) Assignee: Hannspree, Inc., Taipei (TW)

( * ) Notice: Subject to any disclaimer, the term of this patent is extended or adjusted under 35 U.S.C. 154(b) by 45 days.

(21) Appl. No.: 11/028,760

(22) Filed: Jan. 3, 2005

(65) Prior Publication Data
US 2006/0145046 A1  Jul. 6, 2006

(51) Int. Cl.
*G06F 1/16* (2006.01)

(52) U.S. Cl. .................. 361/682; 248/456; 248/922

(58) Field of Classification Search ............. 248/454, 248/455, 456, 457, 917, 921, 922, 121, 460, 248/136; 361/682
See application file for complete search history.

(56) References Cited

U.S. PATENT DOCUMENTS

| | | | | | |
|---|---|---|---|---|---|
| 2,014,476 | A | * | 9/1935 | Johnson | ................... 475/16 |
| 2,563,671 | A | * | 8/1951 | Basinger | ................... 248/456 |
| 3,785,605 | A | * | 1/1974 | Parekh | ................... 248/455 |
| 4,044,980 | A | * | 8/1977 | Cummins | ................... 248/456 |
| 4,618,119 | A | * | 10/1986 | Powell | ................... 248/456 |
| 6,971,622 | B2 | * | 12/2005 | Ziegler et al. | ................... 248/454 |

* cited by examiner

*Primary Examiner*—Ramon O Ramirez
(74) *Attorney, Agent, or Firm*—Ladas & Parry LLP

(57) ABSTRACT

A display device includes a display unit having a front surface for display, a rear surface formed with a vertical row of spaced-apart positioning hole units, and a bottom side. A supporting unit includes a first supporting rod that is connected pivotally to the rear surface of the display unit, that is disposed adjacent to the bottom side, and that is adapted to abut against a supporting surface, and a second supporting rod connected pivotally to the first supporting rod and having a free end formed with a positioning stub that engages a selected one of the positioning hole units in the rear surface of the display unit so that an acute angle is formed between the first and second supporting rods, thereby supporting the display unit on the supporting surface.

19 Claims, 4 Drawing Sheets

DISPLAY DEVICE HAVING A RETRACTABLE SUPPORTING UNIT

BACKGROUND OF THE INVENTION

1. Field of the Invention

The invention relates to a display device, more particularly to a display device having a retractable supporting unit.

2. Description of the Related Art

FIG. 1 illustrates a conventional display device that includes a display panel 10, and a base plate 11 for supporting the display panel 10.

The following are some of the drawbacks of the conventional display device:

1. The base plate 11 has a relatively significant weight for stability purposes, thereby resulting in inconvenience during transport of the display device.

2. Since the base plate 11 has a relatively large area and must be disposed on a flat surface, a large and flat area is required for placement of the conventional display device. This limits the locations where the conventional display device may be positioned.

3. The base plate 11 cannot support the display panel 10 at a position tilted to any considerable degree such that the conventional display device is not suitable for use by those desiring the ability to perform adjustment with different tilt angles.

SUMMARY OF THE INVENTION

Therefore, the object of the present invention is to provide a display device with a retractable supporting unit that can eliminate the aforesaid drawbacks of the prior art.

According to the present invention, a display device comprises:

a display unit having a front surface for display, a rear surface formed with a vertical row of spaced-apart positioning hole units, and a bottom side; and a supporting unit including a first supporting rod that is connected pivotally to the rear surface of the display unit at an end thereof, that is disposed adjacent to the bottom side, and that is adapted to abut against a supporting surface, and a second supporting rod connected pivotally to the first supporting rod and having a free end formed with a positioning stub that engages a selected one of the positioning hole units in the rear surface of the display unit so that an acute angle is formed between the first and second supporting rods, thereby supporting the display unit on the supporting surface.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
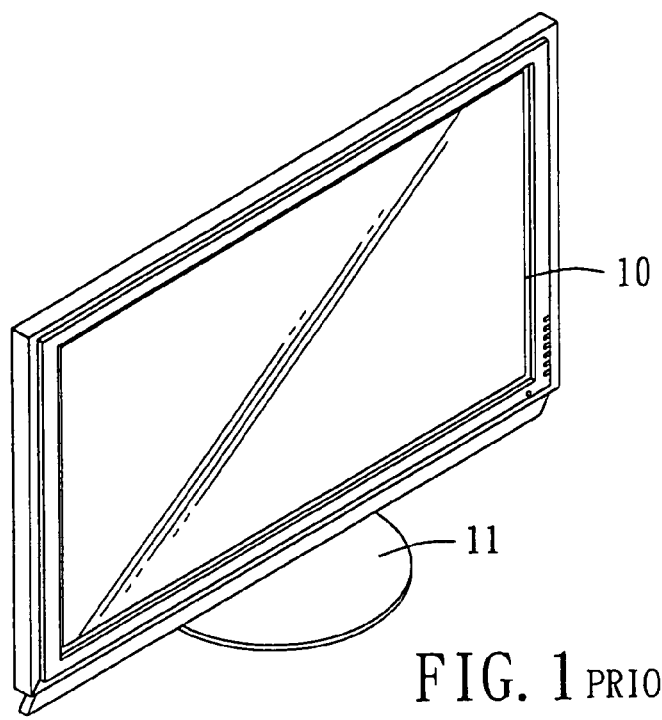
FIG. 1 is a perspective view of a conventional display device.

Before the present invention is described in greater detail, it should be noted that like elements are denoted by the same reference numerals throughout the disclosure.

Figure 2:
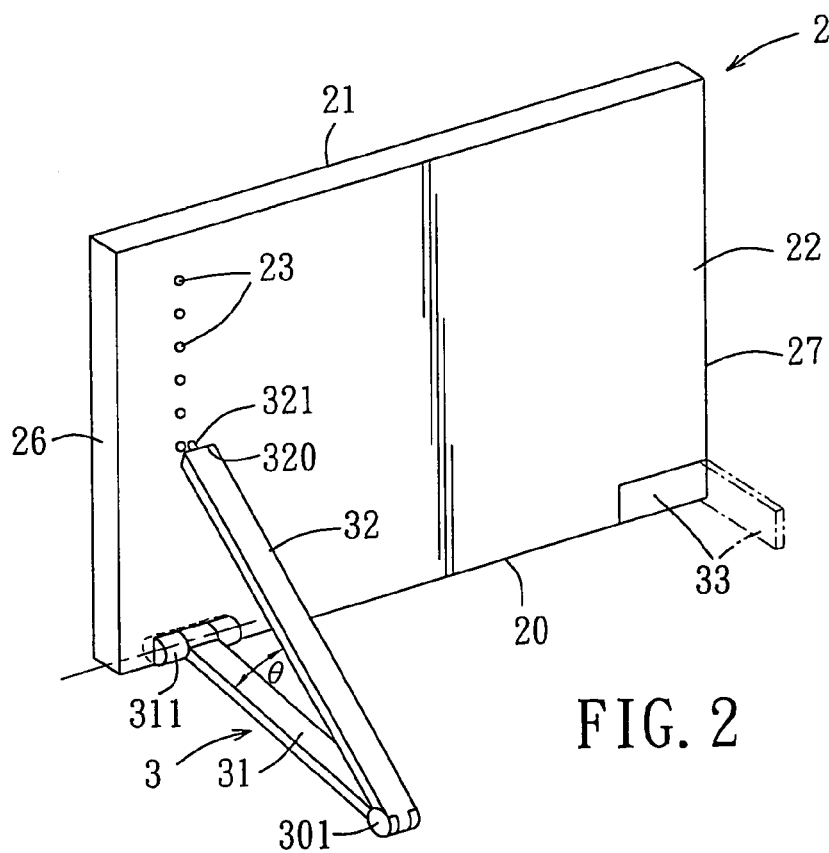
FIG. 2 is a perspective, rear view showing the first preferred embodiment of a display device according to the present invention.

Referring to FIG. 2, the first preferred embodiment of a display device according to the present invention is shown to include a display unit 2, and a supporting unit 3.

The display unit 2 has a front surface 21 for display, a rear surface 22 formed with a vertical row of spaced-apart positioning hole units, and a bottom side 20. In this embodiment, each of the positioning hole units includes a blind hole 23. The display unit 2 is designed as a display panel having two opposite lateral sides 26, 27.

The supporting unit 3 includes a first supporting rod 31 and a second supporting rod 32. The first supporting rod 31 is connected pivotally to the rear surface 22 of the display unit 2 at an end thereof by a pivot member 311 provided adjacent to the bottom side 20 of the display unit 2 to thereby be disposed adjacent to the bottom side 20 and the lateral side 26 of the display unit 2 in this embodiment. The first supporting rod 31 is adapted to abut against a supporting surface (not shown), such as a table surface. The second supporting rod 32 is connected pivotally to the first supporting rod 31 by means of a pivot member 301, and has a free end 320 formed with a positioning stub 321 that engages a selected one of the blind holes 23 so that an acute angle ($\theta$) is formed between the first and second supporting rods 31, 32, thereby supporting the display unit 2 on the supporting surface at a desired tilting angle. In this embodiment, the supporting unit 3 further includes an auxiliary supporting plate 33 that is connected pivotally to the rear surface 22 and that is disposed at a corner between the bottom side 20 and the lateral side 27. The auxiliary supporting plate 33 is operable so as to move between a retracted position, where the auxiliary supporting plate 33 abuts against the rear surface 22, and a support position, where the auxiliary supporting plate 33 is perpendicular to the rear surface 22.

Figure 7:
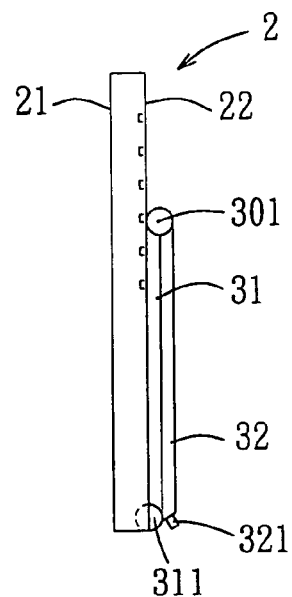
FIG. 7 is a schematic side view showing the first preferred embodiment when a retractable positioning hole unit is disposed at a retracted position.

It is noted that the supporting unit 3 is movable to a retracted position, where the first and second supporting rods 31, 32 are disposed parallel to the rear surface 22 and where the first supporting rod 31 is disposed between the rear surface 22 of the display unit 2 and the second supporting rod 32, as shown in FIG. 7, thereby facilitating carrying of the display device.

Figure 3:
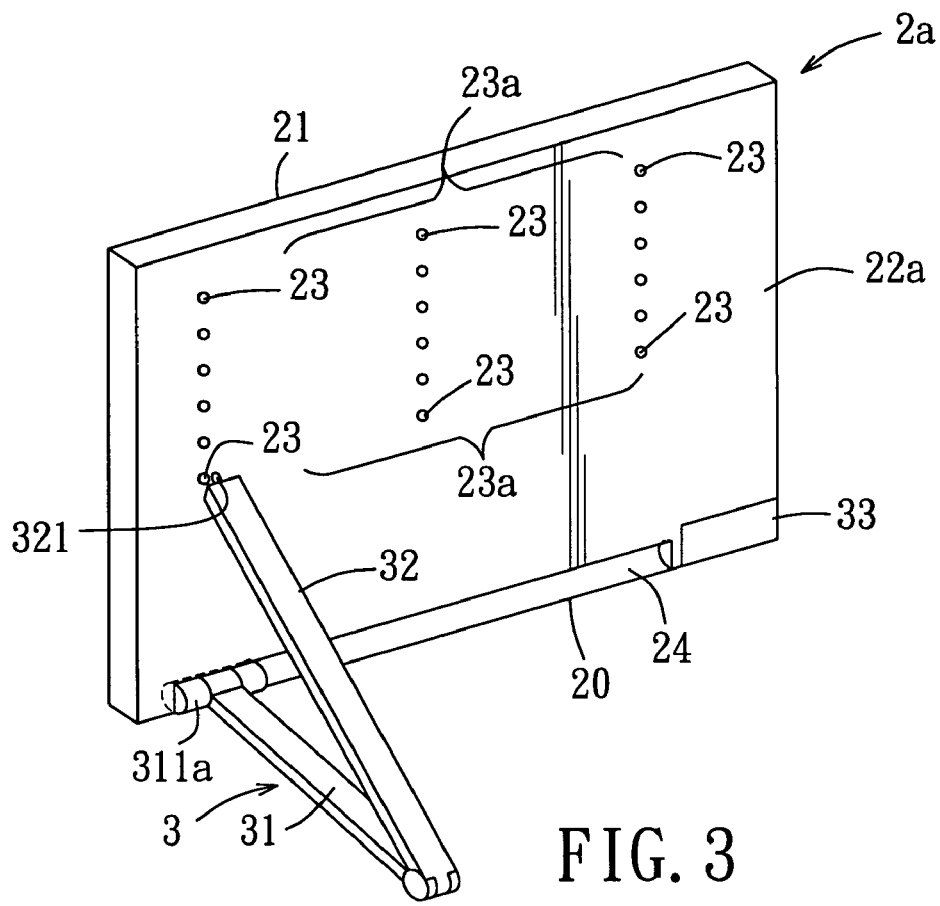
FIG. 3 is a perspective, rear view showing the second preferred embodiment of a display device according to the present invention.
Figure 4:
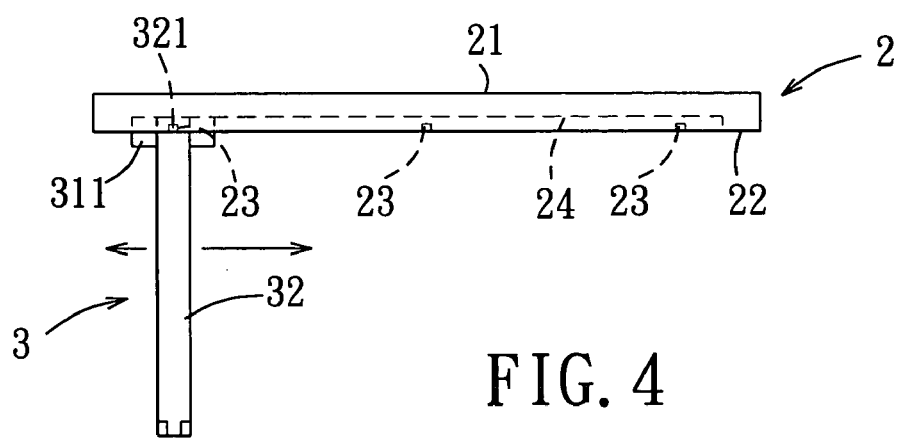
FIG. 4 is a schematic top view showing the second preferred embodiment.

FIGS. 3 and 4 illustrate the second preferred embodiment of a display device according to this invention, which is a modification of the first preferred embodiment. Unlike the first embodiment, each of the positioning hole units (23a) includes a horizontal row of the spaced-apart blind holes 23. The rear surface (22a) of the display unit (2a) is formed with a horizontally extending slide slot 24 that is disposed adjacent to the bottom side 20. The pivot member (311a) is mounted movably in the slide slot 24 and connected pivotally to the first supporting rod 31 of the supporting unit 3. As such, the supporting unit 3 is movable relative to the display unit (2*a*) along the slide slot 24 so as to enable the positioning stub 321 to engage one of the blind holes 23 of the selected one of the positioning hole units (23*a*).

Figure 5:
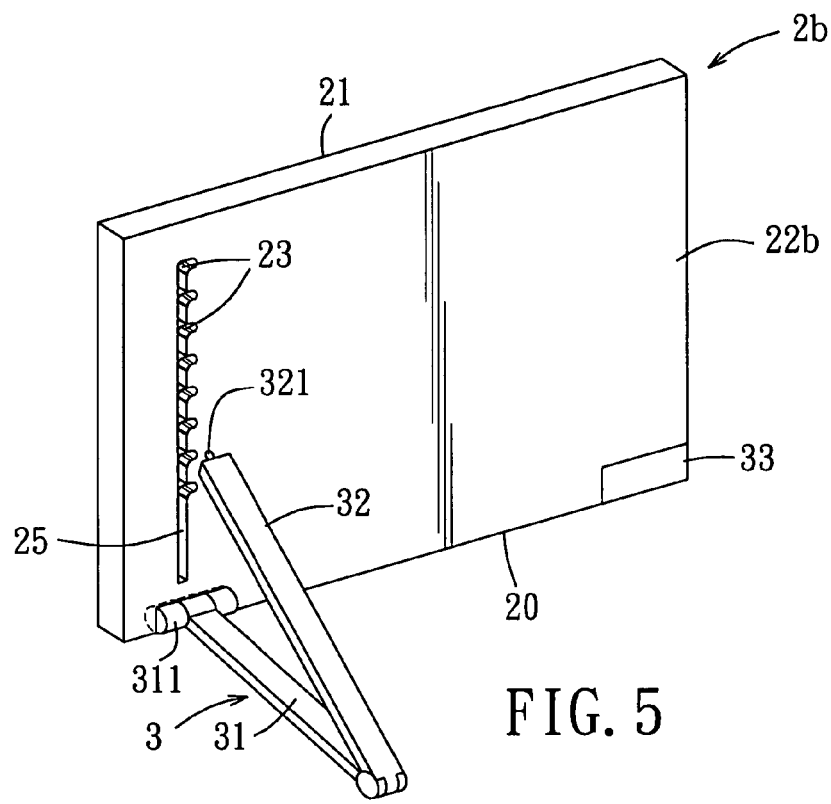
FIG. 5 is a perspective, rear view showing the third preferred embodiment of a display device according to the present invention.

FIG. 5 illustrates the third preferred embodiment of a display device according to this invention, which is a modification of the first preferred embodiment. Unlike the first embodiment, the rear surface (22*b*) of the display unit (2*b*) is further formed with a vertical extending guiding slot 25 that is in spatial communication with each of the blind holes 23 such that the positioning stub 321 is movable in the guiding slot 25 so as to engage the selected one of the blind holes 23.

Figure 6:
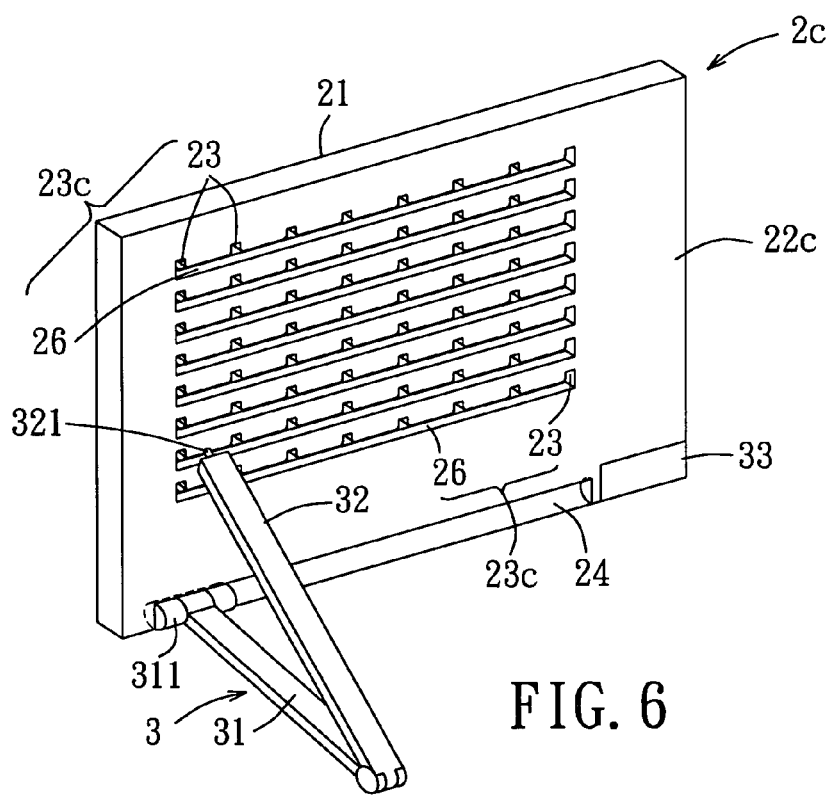
FIG. 6 is a perspective, rear view showing the fourth preferred embodiment of a display device according to the present invention.

FIG. 6 illustrates the fourth preferred embodiment of a display device according to this invention, which is a modification of the second preferred embodiment. Unlike the second preferred embodiment, each of the positioning hole units (23*c*) further includes a horizontal extending guiding slot 26 that is in spatial communication with each of the blind holes 23 thereof such that the positioning stub 321 is movable in the guiding slot 26 of the selected one of the positioning hole units (23*c*) so as to engage one of the blind holes 23 of the selected one of the positioning hole units (23*c*).

Figure 8:
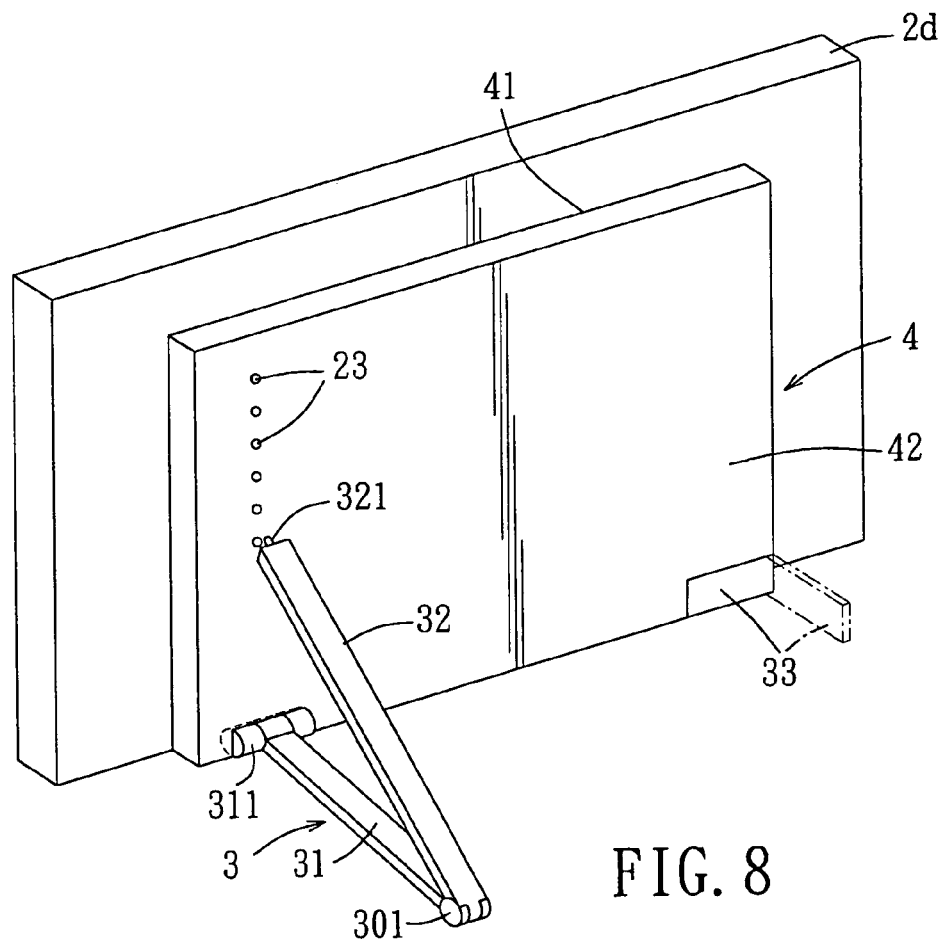
FIG. 8 is a perspective, rear view showing the fifth preferred embodiment of a supporting device for a display panel according to the present invention.

FIG. 8 illustrates the fifth preferred embodiment of a supporting device for a display panel (2*d*) according to this invention is shown to include a mounting plate 4, and the supporting unit 3, which is the same as that in the first preferred embodiment.

In this embodiment, the mounting plate 4 has a front surface 41 adapted to be fixed to the display panel (2*d*), and a rear surface 42 that is designed substantially the same as the rear surface 22 (see FIG. 2) of the display unit in the first preferred embodiment. It is noted that the supporting device of this invention is suitable for display panels of different sizes.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

We claim:

1. A display device comprising:
 a display unit having a front surface for display, a rear surface formed with a vertical row of spaced-apart positioning hole units, a bottom side, and a flat display panel assembled between said front surface and said rear surface; and
 a supporting unit including a first supporting rod that is connected pivotally to said rear surface of said display unit at an end thereof, that is disposed adjacent to said bottom side, and that is adapted to abut against a supporting surface, and a second supporting rod connected pivotally to said first supporting rod and having a free end formed with a positioning stub that engages a selected one of said positioning hole units in said rear surface of said display unit so that an acute angle is formed between said first and second supporting rods, thereby supporting said display unit on the supporting surface.

2. The supporting device as claimed in claim 1, wherein each of said positioning hole units includes a hole for receiving an end of said second supporting rod.

3. The display device as claimed in claim 1, wherein said rear surface of said display panel is further formed with a vertically extending guiding slot that is in spatial communication with each of said positioning hole units such that said positioning stub is movable in said guiding slot so as to engage the selected one of said positioning hole units.

4. The display device as claimed in claim 1, wherein said display unit is designed as a rectangular display panel having two opposite lateral sides, said first supporting rod being disposed adjacent to one of said lateral sides of said display unit, said supporting unit further including an auxiliary supporting plate that is connected pivotally to said rear surface of said display unit and that is disposed at a corner between said bottom side and the other one of said lateral sides of said display unit, said auxiliary supporting plate being operable so as to move between a retracted position, where said auxiliary plate abuts against said rear surface of said display unit, and a support position, where said auxiliary supporting plate is perpendicular to said rear surface of said display unit.

5. The display device as claimed in claim 1, wherein each of said positioning hole units includes a horizontal row of spaced-apart holes, said rear surface of said display unit being formed with a horizontally extending slide slot that is disposed adjacent to said bottom side, said display unit further having a pivot member mounted movably in said slide slot and connected pivotally to said first supporting rod of said supporting unit, said positioning stub engaging one of said holes of the selected one of said positioning hole units.

6. The display device as claimed in claim 5, wherein each of said positioning hole units further includes a horizontally extending guiding slot that is in spatial communication with each of said holes thereof such that said positioning stub is movable in said guiding slot of the selected one of said positioning hole units so as to engage one of said holes of the selected one of said positioning hole units.

7. The display device as claimed in claim 1, wherein said supporting unit is movable to a retracted position, where said first and second supporting rods are disposed parallel to said rear surface of said display unit and where said first supporting rod is disposed between said rear surface of said display unit and said second supporting rod.

8. The display device as claimed in claim 1 wherein the first and second supporting rods are articulated to other another at a pivot point.

9. The display device as claimed in claim 8 wherein the first and second supporting rods are foldable relative to one another about said pivot point so that the first and second supporting rods may assume a collapsed orientation where the first and second supporting rods are parallel to one another when not supporting said display unit.

10. The supporting device a claimed in claim 1 wherein each positioning hole unit comprises a single hole in said rear surface.

11. The supporting device a claimed in claim 1 wherein each positioning hole unit comprises a horizontal row of holes in said rear surface.

12. A supporting device for a display panel comprising:
 a mounting plate having a front surface adapted to be fixed to said display panel, a rear surface formed with a vertical row of spaced-apart positioning hole units, and a bottom side; and
 a supporting unit including a first supporting rod that is connected pivotally to said rear surface of said mounting plate at an end thereof, that is disposed adjacent to said bottom side, and that is adapted to abut against a supporting surface, and a second supporting rod connected pivotally to said first supporting rod and having a free end formed with a positioning stub that engages a selected one of said positioning hole units in said rear surface of said mounting plate so that an acute angle is formed between said first and second supporting rods, thereby supporting the display panel on the supporting surface; and wherein said rear surface of said mounting elate is further formed with a vertically extending guiding slot that is in spatial communication with each of said positioning hole units such that said positioning stub is movable in said guiding slot so as to engage the selected one of said positioning hole units.

13. The supporting device as claimed in claim 12, wherein each of said positioning hole units includes a single hole for receiving an end of said second supporting rod.

14. The supporting device as claimed in claim 12, wherein each of said positioning hole units comprises a row of horizontally disposed holes, each of said horizontally disposed holes being adapted for receiving an end of said second supporting rod.

15. A supporting device for a display panel comprising:
a mounting plate having a front surface adapted to be fixed to said display panel, a rear surface formed with a vertical row of spaced-apart positioning hole units, and a bottom side; and
a supporting unit including a first supporting rod that is connected pivotally to said rear surface of said mounting elate at an end thereof, that is disposed adjacent to said bottom side, and that is adapted to abut against a supporting surface, and a second supporting rod connected pivotally to said first supporting rod and having a free end formed with a positioning stub that engages a selected one of said positioning hole units in said rear surface of said mounting elate so that an acute angle is formed between said first and second supporting rods, thereby supporting the display panel on the supporting surface;
wherein said mounting plate is designed as a rectangular plate having two opposite lateral sides, said first supporting rod being disposed adjacent to one of said lateral sides of said mounting plate, said supporting unit further includes an auxiliary supporting plate that is connected pivotally to said rear surface of said mounting plate and that is disposed at a corner between said bottom side and the other one of said lateral sides of said mounting plate, said auxiliary supporting plate being operable so as to move between a retracted position, where said auxiliary supporting plate abuts against said rear surface of said display unit, and a support position, where said auxiliary plate is perpendicular to said rear surface of said mounting plate.

16. A supporting device for a display panel comprising:
a mounting elate having a front surface adapted to be fixed to said display panel, a rear surface formed with a vertical row of spaced-apart positioning hole units, and a bottom side; and
a supporting unit including a first supporting rod that is connected pivotally to said rear surface of said mounting plate at an end thereof, that is disposed adjacent to said bottom side, and that is adapted to abut against a supporting surface, and a second supporting rod connected pivotally to said first supporting rod and having a free end formed with a positioning stub that engages a selected one of said positioning hole units in said rear surface of said mounting plate so that an acute angle is formed between said first and second supporting rods, thereby supporting the display panel on the supporting surface;
wherein each of said positioning hole units includes a horizontal row of spaced-apart holes, said rear surface of said display unit being formed with a horizontally extending slide slot that is disposed adjacent to said bottom side, said display unit further having a pivot member mounted movably in said slide slot and connected pivotally to said first supporting rod of said supporting unit, said positioning stub engaging one of said holes of the selected one of said positioning hole units.

17. The supporting device as claimed in claim 16, wherein each of said positioning hole units further includes a horizontally extending guiding slot that is in spatial communication with each of said holes thereof such that said positioning stub is movable in said guiding slot of the selected one of said positioning hole units so as to engage one of said holes of the selected one of said positioning hole units.

18. A supporting device for a display panel comprising:
a mounting plate having a front surface adapted to be fixed to said display panel, a rear surface formed with a vertical row of spaced-apart positioning hole units, and a bottom side; and
a supporting unit including a first supporting rod that is connected pivotally to said rear surface of said mounting plate at an end thereof, that is disposed adjacent to said bottom side, and that is adapted to abut against a supporting surface, and a second supporting rod connected pivotally to said first supporting rod and having a free end formed with a positioning stub that engages a selected one of said positioning hole units in said rear surface of said mounting elate so that an acute angle is formed between said first and second supporting rods, thereby supporting the display panel on the supporting surface, said supporting unit being movable to a retracted position, where said first and second supporting rods are disposed parallel to said rear surface of said mounting plate and where said first supporting rod is disposed between said rear surface of said mounting plate and said second supporting rod.

19. The supporting device a claimed in claim 18 wherein each positioning hole unit comprises a single hole in said rear surface or a plurality of holes in said rear surface arranged in a horizontal row.

* * * * *